United States Patent
Moon et al.

(10) Patent No.: US 11,902,006 B2
(45) Date of Patent: Feb. 13, 2024

(54) COMMUNICATION SYSTEM AND OPERATING METHOD THEREOF

(71) Applicant: SOLiD, INC., Seongnam-si (KR)

(72) Inventors: Woosik Moon, Seongnam-si (KR); Hoony Hong, Seoul (KR); Kwon Kim, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 52 days.

(21) Appl. No.: 17/779,423

(22) PCT Filed: Nov. 25, 2020

(86) PCT No.: PCT/KR2020/016829
§ 371 (c)(1),
(2) Date: May 24, 2022

(87) PCT Pub. No.: WO2021/107599
PCT Pub. Date: Jun. 3, 2021

(65) Prior Publication Data
US 2022/0416878 A1    Dec. 29, 2022

(30) Foreign Application Priority Data

Nov. 25, 2019 (KR) .................. 10-2019-0152645
Nov. 24, 2020 (KR) .................. 10-2020-0159370

(51) Int. Cl.
| | | |
|---|---|---|
| H04B 7/155 | (2006.01) | |
| H04W 72/21 | (2023.01) | |
| H04W 74/08 | (2009.01) | |

(52) U.S. Cl.
CPC ............ H04B 7/155 (2013.01); H04W 72/21 (2023.01); H04W 74/0833 (2013.01)

(58) Field of Classification Search
CPC ..... H04L 5/0048; H04L 5/001; H04L 5/0023; H04L 5/00; H04L 5/14; H04L 1/12;
(Continued)

(56) References Cited

U.S. PATENT DOCUMENTS

2011/0201268 A1    8/2011    He et al.
2013/0170353 A1    7/2013    Liu
(Continued)

FOREIGN PATENT DOCUMENTS

CN    104079329 A    10/2014
JP    2018-512779 A    5/2018

OTHER PUBLICATIONS

Japanese Office Action dated May 9, 2023 issued in Application No. 2022-530249.
(Continued)

*Primary Examiner* — Eva Y Puente
(74) *Attorney, Agent, or Firm* — Sughrue Mion, PLLC

(57) ABSTRACT

Provided are a method of operating a communication system, the method comprises mapping some antennas selected from among a plurality of antennas of each of a plurality of first communication nodes and reception ports of a second communication node, combining uplink signals mapped to an identical reception port of the second communication node from among uplink signals received through the plurality of antennas, and transmitting the combined signals to the mapped reception ports of the second communication node, respectively.

15 Claims, 4 Drawing Sheets

(58) Field of Classification Search
CPC ......... H04L 1/189; H04L 67/12; H04L 5/005;
H04W 72/23; H04W 74/0808; H04W
72/21; H04W 16/14; H04W 88/02; H04W
74/006; H04W 28/26; H04W 72/0453;
H04B 7/0695; H04B 7/088; H04B
7/0626; H04B 7/0617; H04B 17/318;
H04B 7/0639; H04B 7/0632; H04B
7/0456
USPC ........................................................ 375/262
See application file for complete search history.

(56) References Cited

U.S. PATENT DOCUMENTS

| | | | |
|---|---|---|---|
| 2013/0195083 A1* | 8/2013 | Kim | H04W 72/0446 370/336 |
| 2014/0031049 A1 | 1/2014 | Sundaresan et al. | |
| 2018/0049173 A1* | 2/2018 | Chen | H04W 76/28 |
| 2019/0335379 A1* | 10/2019 | Joseph | H04W 40/246 |
| 2021/0029550 A1* | 1/2021 | Notargiacomo | H04W 16/14 |

OTHER PUBLICATIONS

International Search Report for PCT/KR2020/016829 dated Mar. 4, 2021 [PCT/ISA/210].
Written Opinion for PCT/KR2020/016829 dated Mar. 4, 2021 [PCT/ISA/237].
Japanese Office Action dated Nov. 7, 2023 in Japanese Application No. 2022-530249.
Communication issued in the European Patent Office in corresponding EP Application No. 20893841.5-1206 dated Dec. 4, 2023.
Hitachi, Ltd. "A feedback scheme for downlink transmission with multi-point multi-user MIMO" 3GPP TSG RAN WG1 # 56bis, Seoul, South Korea, Mar. 23-27, 2009.

* cited by examiner

COMMUNICATION SYSTEM AND OPERATING METHOD THEREOF

TECHNICAL FIELD

The present invention relates to a communication system and an operating method thereof, and more particularly, to a communication system capable of mapping some antennas selected from among a plurality of antennas of each of a plurality of first communication nodes and reception ports of a second communication node, and combining and transmitting uplink signals mapped to an identical reception port, and an operating method thereof.

BACKGROUND ART

In the existing mobile communication system, in order to provide a communication service to a base station shadow area such as a building or subway, a distributed antenna structure is constructed with a remote wireless device, and the remote wireless device and a digital device of a base station are connected to each other using a matching device.

In particular, when implementing a distributed antenna system in a 5G mobile communication system, there is a limit to installing an additional dedicated cable for 5G communication, so the cable installed for 3G/4G communication is often shared. However, there is a problem that the cable installed for 3G/4G communication has insufficient capacity to support the maximum transmission speed defined in the 5G standard specification.

In addition, as the number of remote units RU increases in the 5G environment, there is a problem in that a signal-to-noise ratio (SNR) deteriorates because noise is also combined in the process of combining signals received from several remote units and transmitting them to an upper node.

DESCRIPTION OF EMBODIMENTS

Technical Problem

The present invention provides a communication system capable of mapping some antennas selected from among a plurality of antennas of each of a plurality of first communication nodes and reception ports of a second communication node, and combining and transmitting mapped uplink signals to an identical reception port, and an operating method thereof.

Solution to Problem

According to an aspect of an embodiment, a method of operating a communication system may comprise mapping some antennas selected from among a plurality of antennas of each of a plurality of first communication nodes and reception ports of a second communication node, combining uplink signals mapped to an identical reception port of the second communication node from among uplink signals received through the plurality of antennas and transmitting the combined signals to the mapped reception ports of the second communication node, respectively.

According to an aspect of an embodiment, each of the first communication nodes may be a remote unit or a hub unit, and the second communication node may be a distributed unit.

According to an aspect of an embodiment, the method may further comprise selecting some of the antennas to be mapped to the reception ports of the second communication node from among the plurality of antennas of each of the plurality of first communication nodes.

According to an aspect of an embodiment, the selecting may comprise selecting the some antennas based on signal quality of the uplink signals received through the plurality of antennas of each of the plurality of first communication nodes.

According to an aspect of an embodiment, the signal quality may be a signal to noise ratio (SNR) of a communication signal.

According to an aspect of an embodiment, the selecting may comprise selecting the some antennas based on presence or absence of the uplink signal received through the plurality of antennas of each of the plurality of first communication nodes or load of the uplink signals.

According to an aspect of an embodiment, the load of the uplink signals may be detected by searching for at least one of a physical random access channel (PRACH) and a physical uplink shared channel (PUSCH) included in the uplink signal.

According to an aspect of an embodiment, the mapping may comprise mapping the selected some antennas and the reception ports of the second communication node based on signal quality of the uplink signals received through the plurality of antennas of each of the plurality of first communication nodes.

According to an aspect of an embodiment, the mapping may comprise mapping the selected some antennas and the reception ports of the second communication node based on the load of the uplink signals received through the plurality of antennas of each of the plurality of first communication nodes.

According to an aspect of an embodiment, the mapping may comprise mapping any one of the plurality of antennas to at least two or more reception ports from among the plurality of reception ports of the second communication node.

According to an aspect of an embodiment, the mapping may comprise mapping at least some antennas from among the plurality of antennas of each of the first communication nodes to a reception port of the second communication node having a port number different from a port number of the at least some antennas.

According to an aspect of an embodiment, the mapping may be performed in an uppermost node from among the plurality of first communication nodes connected to each other in a cascade structure, the second communication node, or an upper node of the second communication node.

According to an aspect of an embodiment, the method may further comprise combining at least a portion of the uplink signals in an Equal Gain Combine (EGC) or Maximal Ratio Combine (MRC) manner.

According to an aspect of an embodiment, the method may further comprise including mapping information in the uplink signals received by the first communication node.

According to an aspect of an embodiment, a communication system may comprise a plurality of first communication nodes each including a plurality of antennas and a second communication node configured to receive uplink signals transmitted from the plurality of first communication nodes, wherein each of the plurality of first communication nodes includes mapping information of some antennas selected from among the plurality of antennas and reception ports of the second communication node to the uplink signals, combines uplink signals mapped to an identical reception port of the second communication node from among uplink signals received through the plurality of antennas based on the mapping information, and transmits the combined signals to the mapped reception ports of the second communication node, respectively.

Advantageous Effects of Disclosure

A method and a device according to an embodiment of the present invention may reduce deterioration of a signal-to-noise ratio of a communication signal in uplink communication of a communication system having a cascade structure by mapping reception ports of a second communication node with some antennas selected from among a plurality of antennas of each of a plurality of first communication nodes.

A method and a device according to an embodiment of the present invention may solve the problem of insufficient capacity of a communication line by flexibly allocating a communication port of an upper node based on the signal quality and load of uplink signals transmitted through various paths in a communication system.

BRIEF DESCRIPTION OF DRAWINGS

A brief description of each drawing is provided to fully understand drawings recited in the detailed description of the present invention.

MODE OF DISCLOSURE

Figure 1:
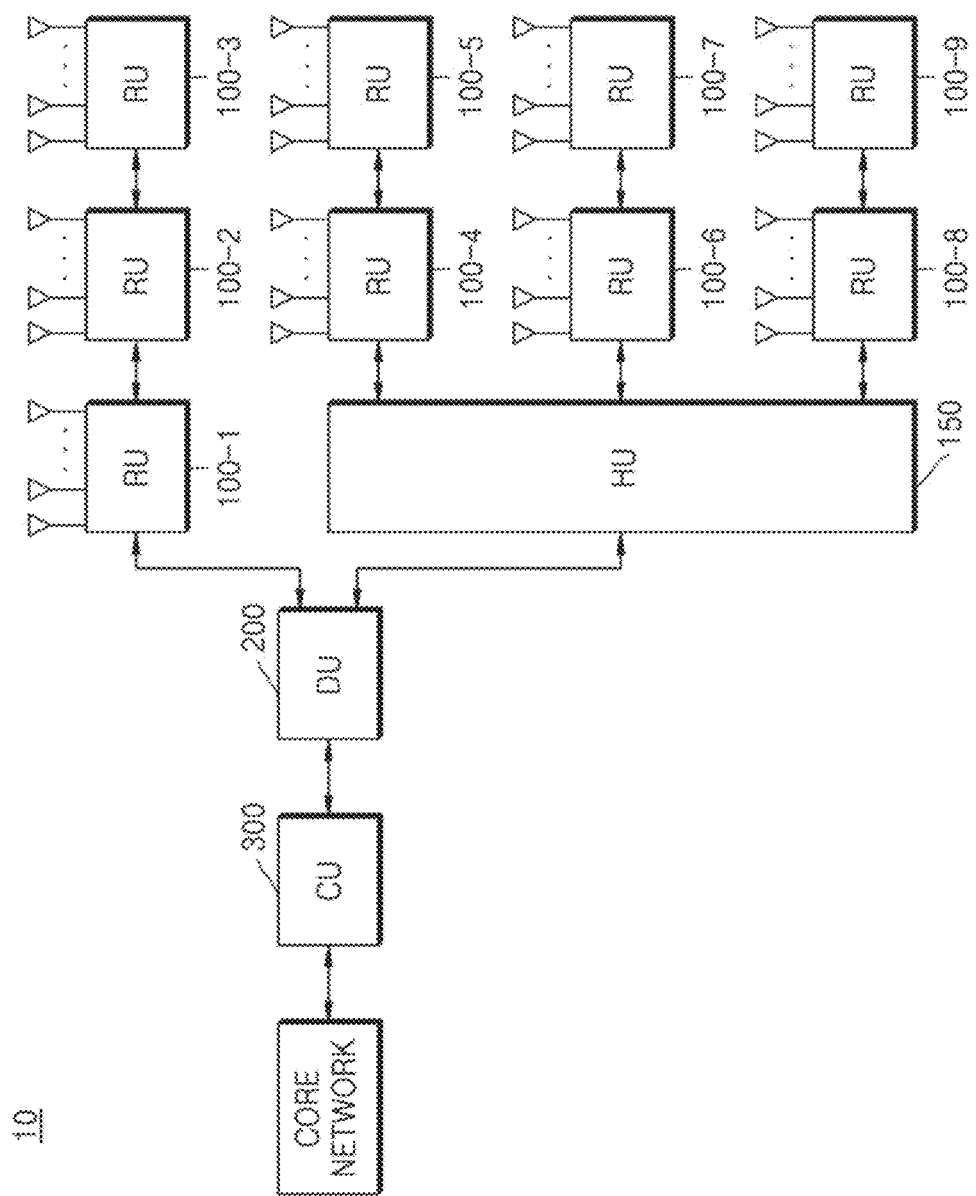
FIG. 1 is a conceptual diagram of a communication system according to an embodiment of the present invention.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

FIG. 1 is a conceptual diagram of a communication system according to an embodiment of the present invention.

Referring to FIG. 1, a communication system 10 may include a plurality of remote units (RUs) 100-1 to 100-9, a hub unit (HU) 150, a distributed unit (DU) 200, a centralized unit (CU) 300, and a core network.

The plurality of remote units 100-1 to 100-9 may be connected to the distributed unit 200 or the hub unit 150 and distributed to transmit and receive signals transmitted/received from a base station at locations distributed in various shaded areas or dense areas.

According to an embodiment, the communication system 10 may split physical layer between the plurality of remote units 100-1 to 100-9 and the distributed unit 200. The plurality of remote units 100-1 to 100-9 may process a lower physical layer Low-PHY, and the distributed unit 200 may process an upper physical layer High-PHY.

According to another embodiment, each of the plurality of remote units 100-1 to 100-9 may process a physical layer and a media access control (MAC) layer together.

According to an embodiment, as used herein, the term "remote unit" may broadly mean a unit that is distributed and deployed to expand the coverage of a wireless communication service, and may be called by various terms such as an active antenna unit (AAU) or O-RU.

According to an embodiment, the plurality of remote units 100-1 to 100-9 and the distributed unit 200, the hub unit 150 and the distributed unit 200, or the plurality of remote units 100-1 to 100-9 and the hub unit 150 may be connected to each other through various communication media such as an optical cable, a high-speed cable, or a microwave cable.

According to an embodiment, the plurality of remote units 100-1 to 100-9 and the distributed unit 200 may conform to various fronthaul communication standards. For example, an Ethernet-based common public radio interface (eCPRI), which is a 5G fronthaul interface standard, may be used between the plurality of remote units 100-1 to 100-9 and the distributed unit 200, but the present invention is not limited thereto.

Each of the plurality of remote units 100-1 to 100-9 may include a multiple input multiple output (MIMO) antenna composed of a plurality of antennas.

The hub unit 150 may combine uplink signals transmitted from the plurality of remote units 100-1 to 100-9 and transmit them to the distributed unit 200.

According to an embodiment, the hub unit 150 may combine uplink signals transmitted from a plurality of branches (e.g., a first branch (formed by 100-4 and 100-5), a second branch (formed by 100-6 and 100-7), and a third branch (formed by 100-8 and 100-9)).

According to an embodiment, the communication system 10 may include a plurality of hub units.

The base station may be divided into the distributed unit 200 and the centralized unit 300, wherein the distributed unit 200 and the centralized unit 300 may split functions in various forms according to various function split options (e.g., 3GPP TR38.801 standard, etc.).

According to an embodiment, the distributed unit 200 and the centralized unit 300 may split and process at least a portion of RRC, PDCP, High-RLC, Low-RLC, High-MAC, Low-MAC, and High-PHY layers.

FIG. 1 illustrates a structure in which the base station is divided into the distributed unit 200 and the centralized unit 300, but is not limited thereto, and various modifications are possible.

The centralized unit 300 may directly work with a core network, and may interface between the core network and the base station.

Each of the plurality of remote units 100-1 to 100-9, the hub unit 150, the distributed unit 200, and the centralized unit 300 may constitute a communication node in the communication system 10.

The plurality of remote units 100-1 to 100-9 may be connected to the hub unit 150 or the distributed unit 200 in a cascade structure. According to an embodiment, the remote unit (e.g., 100-1) may be directly connected to the distributed unit 200. According to an embodiment, the remote units (e.g., 100-2 and 100-3) may be connected in series to a remote unit 100. According to an embodiment, the remote units (e.g., 100-4 and 100-5) may be connected in series to the hub unit 150.

According to another embodiment, the remote units 100-1 to 100-9 may be connected to the hub unit 150 or the distributed unit 200 in a tree structure.

According to an embodiment, each of the plurality of remote units 100-1 to 100-9, the hub unit 150, the distributed unit 200, and the centralized unit 300 includes a memory and a processor, and may process a communication signal transmitted and received to transmit the processed communication signal to an upper communication node or a lower communication node.

The detailed structure and operation of the remote units 100-1 to 100-9 will be described later with reference to FIGS. 2 and 3.

Figure 2:
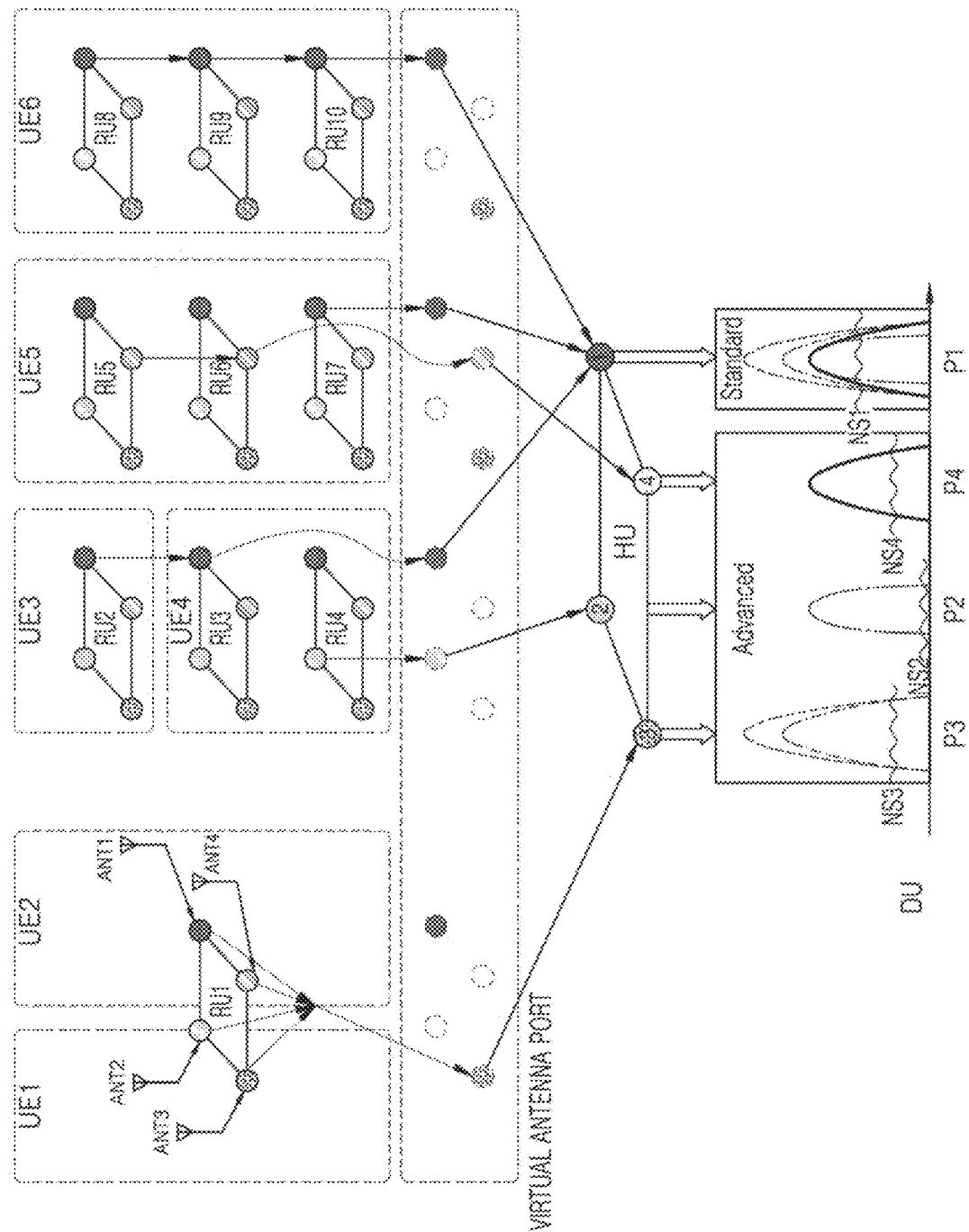
FIG. 2 is a view illustrating a form in which uplink signals transmitted from remote units are mapped and transmitted to a reception port of a distributed unit in a communication system, according to an embodiment of the present invention.

FIG. 2 is a view illustrating a form in which uplink signals transmitted from remote units are mapped and transmitted to a reception port of a distributed unit in a communication system according to an embodiment of the present invention.

Referring to FIG. 2, for convenience of description, remote units RU1 to RU10, a hub unit HU, and a distributed unit DU are illustrated from among communication nodes constituting the communication system, and illustration of upper components of the distributed unit DU is omitted.

Each of the plurality of remote units RU1 to RU10 may be included in communication coverage of different user terminals UE1 to UE6.

According to an embodiment, the first remote unit RU1 may include external antennas ANT1 to ANT4 spatially separated by using an extension cable, etc. In this case, the antennas ANT1 to ANT4 may have different communication coverages. For example, the communication coverage of the second antenna ANT2 and the third antenna ANT3 may include the first user terminal UE1, and the communication coverage of the first antenna ANT1 and the fourth antenna ANT4 may include the second user terminal UE2.

The plurality of remote units RU1 to RU10 may be connected to each other in a cascade structure, and a physical connection structure is omitted in FIG. 2 for convenience of description. According to an embodiment, each of the first remote unit RU1, the fourth remote unit RU4, and the seventh remote unit RU7 may be directly connected to the hub unit HU, the second remote unit RU2 and the third remote unit RU3 may be connected to the hub unit HU after being serially connected to each other, the fifth remote unit RU5 and the sixth remote unit RU6 may be connected to the hub unit HU after being serially connected to each other, and the eighth remote unit RU8, the ninth remote unit RU9, and the tenth remote unit RU10 may be connected to the hub unit HU after being serially connected to each other.

Some of the antennas from among the plurality of antennas of each of the plurality of remote units RU1 to RU10 may be selectively mapped to reception ports of the distributed unit DU.

FIG. 2 illustrates a case in which only one of the plurality of antennas of each of the remote units RU2 to RU10 is selected in the case of the second remote unit RU2 to the tenth remote unit RU10.

According to an embodiment, some antennas may be selected from among the plurality of antennas based on the signal quality of uplink signals received through the plurality of antennas of each of the plurality of remote units RU1 to RU10. For example, some antennas through which an uplink signal having excellent signal quality is received may be selected.

According to an embodiment, the signal quality may be a signal-to-noise ratio.

According to an embodiment, some of the plurality of antennas may be selected based on the presence or absence of uplink signals received through the plurality of antennas of each of the plurality of remote units RU1 to RU10 or the load of the uplink signals. In this case, some of the plurality of antennas may be selected according to a ratio of the load of the uplink signals to the capacity of a transmission line through which the uplink signals are transmitted. For example, when the load of uplink signals received by remote units (e.g., RU2 and RU3) connected to a specific transmission line (or branch) is higher than that of another transmission line (or branch), a smaller number of antennas may be selected in each of the remote units (e.g., RU2 and RU3) on the specific transmission line (or branch) compared to a remote unit (e.g., RU4) connected on another transmission line.

According to an embodiment, the load of uplink signals may be calculated for each transmission line (or branch).

According to an embodiment, the load of uplink signals may be detected through discovery of at least one of a physical random access channel (PRACH) and a physical uplink shared channel (PUSCH) included in the uplink signals.

Some antennas selected from among the plurality of antennas of each of the plurality of remote units RU1 to RU10 may be mapped to reception ports of the distributed unit DU.

According to an embodiment, some antennas selected from among the plurality of antennas of each of the plurality of remote units RU1 to RU10 may be mapped based on the signal quality of uplink signals received through the plurality of antennas. According to an embodiment, an antenna that receives an uplink signal having relatively good signal quality (e.g., signal-to-noise ratio) may be mapped to relatively more reception ports of the distributed unit DU.

According to an embodiment, some antennas selected from among the plurality of antennas of each of the plurality of remote units RU1 to RU10 may be mapped based on the presence or absence of an uplink signal received through the plurality of antennas or the load of uplink signals. According to an embodiment, an antenna that receives an uplink signal with a relatively high load may be mapped to relatively more reception ports of the distributed unit DU.

According to an embodiment, in mapping of at least some of the plurality of antennas of each of the plurality of remote units RU1 to RU10 and the reception ports of the distributed unit DU, an equal number (or ratio) of antennas may be initially mapped for each reception port of the distributed unit DU, and the mapping may be flexibly or adaptively readjusted based on the signal quality of uplink signals, the presence or absence of an uplink signal, or a load of uplink signals.

Looking at combined signals received by each of reception ports P1 to P4 of the distributed unit DU at the bottom of FIG. 2, it can be seen that a noise level NS1 of the first port P1 is the highest. According to an embodiment, when it is determined that a signal-to-noise ratio at the first port P1 is excessively high, a portion of an antenna mapped to the first port P1 of the distributed unit DU may be remapped to the second port P2 having a relatively low noise level.

According to an embodiment, one antenna may be mapped to at least two or more reception ports of the distributed unit.

According to an embodiment, at least some of the plurality of antennas of each of the plurality of remote units RU1 to RU10 may be mapped to a reception port of the distributed unit DU having a port number different from the port number of the at least some antennas.

A virtual antenna port may be used to map some antennas selected from among the plurality of antennas of each of the plurality of remote units RU1 to RU10 to the reception ports of the distributed unit DU. The virtual antenna port may mean mapping information included in an uplink signal transmitted from each of the plurality of remote units RU1 to RU10.

According to an embodiment, if uplink signals respectively transmitted from a plurality of remote units (e.g., RU2, RU3, RU7, RU8, RU9, and RU10) include mapping information for mapping with a first port of the distributed unit DU, a remote unit or a hub unit through which the uplink signals pass may combine mapped uplink signals to an identical reception port (e.g., the first port) of the distributed unit DU based on the mapping information, and transmit the combined signal to the mapped reception port (e.g., the first port) of the distributed unit DU.

According to an embodiment, if uplink signals transmitted from a remote unit (e.g., RU4) include mapping information for mapping with the second port of the distributed unit DU, a remote unit or a hub unit through which the uplink signals pass may combine uplink signals mapped to an identical reception port (e.g., the second port) of the distributed unit DU based on the mapping information, and transmit the combined signal to the mapped reception port (e.g., the second port) of the distributed unit DU.

According to an embodiment, if uplink signals transmitted from a remote unit (e.g., RU1) include mapping information for mapping with the third port of the distributed unit DU, a remote unit or a hub unit through which the uplink signals pass may combine uplink signals mapped to an identical reception port (e.g., the third port) of the distributed unit DU based on the mapping information, and transmit the combined signal to the mapped reception port (e.g., the third port) of the distributed unit DU.

According to an embodiment, the second antenna ANT2 and the third antenna ANT3 of the first remote unit RU1 may receive a communication signal transmitted by the first user terminal UE1, the first antenna ANT1 and the fourth antenna ANT4 may receive a communication signal transmitted by the second user terminal UE2, and all of the received communication signals may be mapped and transmitted to a third virtual antenna port. The antennas ANT1 to ANT4 of the first remote unit RU1 are all mapped to an identical reception port (e.g., the third port) of the distributed unit DU.

According to an embodiment, signals received from antennas (e.g., ANT1 and ANT4, or ANT2 and ANT3) included in the coverage of an identical user terminal of the remote unit (e.g., RU1) may be combined within the remote unit (e.g., RU1). According to an embodiment, a signal combining method may be equal gain combine (EGC) or maximal ratio combine (MRC).

According to an embodiment, if uplink signals respectively transmitted from a plurality of remote units (e.g., RU5 and RU6) include mapping information for mapping with a fourth port of the distributed unit DU, a remote unit or a hub unit through which the uplink signals pass may combine mapped uplink signals to an identical reception port (e.g., the fourth port) of the distributed unit DU based on the mapping information, and transmit the combined signal to the mapped reception port (e.g., the fourth port) of the distributed unit DU. In this case, the signal combining may be performed in the sixth remote unit RU6, and the signal combining method may be the EGC or the MRC.

According to an embodiment, a setting for selecting some antennas from among a plurality of antennas of each of the plurality of remote units (RU1 to RU10), or a setting for mapping to the selected some antennas and the reception port of the distributed unit DU may be performed at an uppermost node (e.g., the remote unit 100-1 or the hub unit 150 of FIG. 1) of each branch forming a cascade structure in a communication system, or at the base station side (e.g., the distributed unit 200 or the centralized unit 300).

In this case, the uppermost node (e.g., the remote unit 100-1 or the hub unit 150 of FIG. 1) of each branch forming a cascade structure or the base station side (e.g., the distributed unit 200 or the centralized unit 300) may receive a message for confirming a network structure from remote units or may obtain information about the network structure through transmission of a test signal (using a round-trip delay time of the test signal, etc.).

According to an embodiment, operations processed by each of the plurality of remote units RU1 to RU10 according to a setting for selecting some antennas from among a plurality of antennas of each of the plurality of remote units RU1 to RU10 or according to a setting for mapping the selected some antennas and the reception port of the distributed unit DU will be described later with reference to FIG. 3.

According to an embodiment, uplink signals mapped to an identical port of the distributed unit DU may be combined at a front end of the reception port in the remote unit RU, the hub unit HU, or the distributed unit DU. According to an embodiment, a combiner or multiplexer for combining uplink signals mapped to an identical port may be included in the front end of the reception port in the remote unit RU, the hub unit HU, or the distributed unit DU.

Figure 3:
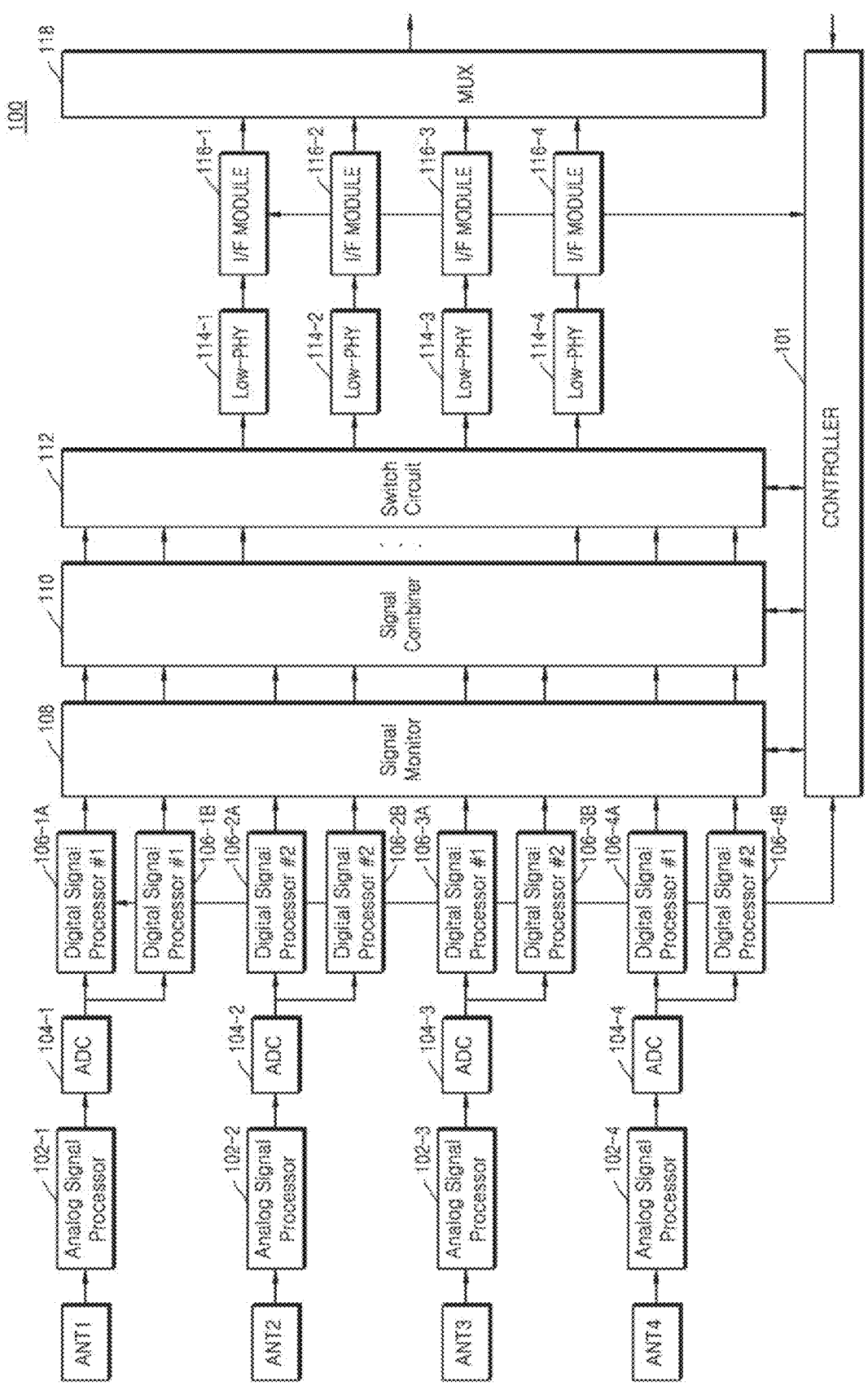
FIG. 3 is a block diagram according to an embodiment of a remote unit of the communication system shown in FIG. 1.

FIG. 3 is a block diagram according to an embodiment of a remote unit of the communication system shown in FIG. 1.

Referring to FIGS. 1 and 3, the remote unit 100 may include a controller 101, the plurality of antennas ANT1 to ANT4, a plurality of analog signal processors 102-1 to 102-4, a plurality of analog-to-digital converters (ADCs) 104-1 to 104-4, a plurality of digital signal processors 106-1A to 106-4A and 106-1B to 106-4B, a signal monitor 108, a signal combiner 110, a switch circuit 112, a plurality of lower physical layer processors 114-1 to 114-4, a plurality of interface modules 116-1 to 116-4, and a multiplexer 118.

The controller 101 may control all operations of the components 102 to 118 in the remote unit 100.

Each of the plurality of antennas ANT1 to ANT4 may receive communication signals for an identical user terminal or different user terminals.

According to an embodiment, the plurality of antennas ANT1 to ANT4 may be implemented as MIMO antennas.

Each of the plurality of analog signal processors 102-1 to 102-4 may perform analog signal processing (e.g., signal amplification, frequency band conversion, or bandpass filtering, etc.) on RF signals transmitted from each of the plurality of antennas ANT1 to ANT4.

The plurality of analog-to-digital converters 104-1 to 104-4 may convert analog uplink signals processed by the plurality of analog signal processors 102-1 to 102-4 into digital signals, respectively.

Each of the plurality of digital signal processors 106-1A to 106-4A and 106-1B to 106-4B may perform digital signal processing on digitally converted uplink signals.

According to an embodiment, the first digital signal processors 106-1A to 106-4A and the second digital signal processors 106-1B to 106-4B may process signals of different frequency bands. According to an embodiment, the first digital signal processors 106-1A to 106-4A and the second digital signal processors 106-1B to 106-4B may selectively operate under the control of the controller 101.

The signal monitor 108 may monitor signal quality or characteristics of uplink signals respectively digital signal-processed by the plurality of digital signal processors 106-1A to 106-4A and 106-1B to 106-4B.

According to an embodiment, the signal monitor 108 may monitor a signal-to-noise ratio of uplink signals respectively digital signal-processed by the plurality of digital signal processors 106-1A to 106-4A and 106-1B to 106-4B.

The signal combiner 110 may combine at least some of the uplink signals.

According to an embodiment, the signal combiner 110 may combine and output at least some of the uplink signals in an EGC or MRC manner.

According to an embodiment, the signal combiner 110 may output a combined signal generated by combining the uplink signals digital respectively signal-processed by the plurality of digital signal processors 106-1A to 106-4A and 106-1B to 106-4B and at least some of the uplink signals.

According to an embodiment, the signal combiner 110 may combine at least some of the uplink signals under the control of the controller 101.

The switch circuit 112 may select and output some of the plurality of uplink signals or combined signals transmitted from the signal combiner 110.

According to an embodiment, the switch circuit 112 may prevent noise from being added by blocking a path where there is no signal transmission in the signal combiner 110.

According to an embodiment, the switch circuit 112 may be switched to block the remaining signal paths except for a path corresponding to an uplink signal received from a selected antenna or uplink signals received and combined by selected antennas under the control of the controller 101.

Each of the plurality of lower physical layer processors 114-1 to 114-4 may perform lower physical layer Low-PHY processing on the uplink signals transmitted by the switch circuit 112.

For example, each of the plurality of lower physical layer processors 114-1 to 114-4 may perform Cyclic Prefix (CP) removal, Discrete Fourier Transform (DFT), data compression, or Physical Random Access Channel (PRACH) signal processing, beam forming, gain control, and the like on the uplink signals.

Each of the plurality of interface modules 116-1 to 116-4 may perform interfacing (e.g., data format conversion, etc.) for transmitting the uplink signals to upper communication nodes of the remote unit 100.

According to an embodiment, each of the plurality of interface modules 116-1 to 116-4 may add mapping information (or virtual antenna port information) for mapping a plurality of uplink signals to reception ports of a distributed unit.

According to an embodiment, the mapping information (or virtual antenna port information) may be included in a header of an uplink signal.

According to an embodiment, mapping information (or virtual antenna port information) to be added to uplink signals by each of the plurality of interface modules 116-1 to 116-4 may be set by the controller 101. According to an embodiment, the mapping information (or virtual antenna port information) may be received from an upper communication node (e.g., an uppermost remote unit, a hub unit, a distributed unit, or a centralized unit of a corresponding branch) of the remote unit 100.

The multiplexer 118 may combine and output uplink signals output from the plurality of interface modules 116-1 to 116-4.

In this specification, "combination" of signals may have a meaning including signal combining by the signal combiner 110 and signal combining by the multiplexer 118.

According to an embodiment, a rear end of the multiplexer may further include a signal transmission module for transmitting an uplink signal from the remote unit 100 to another communication node.

Figure 4:
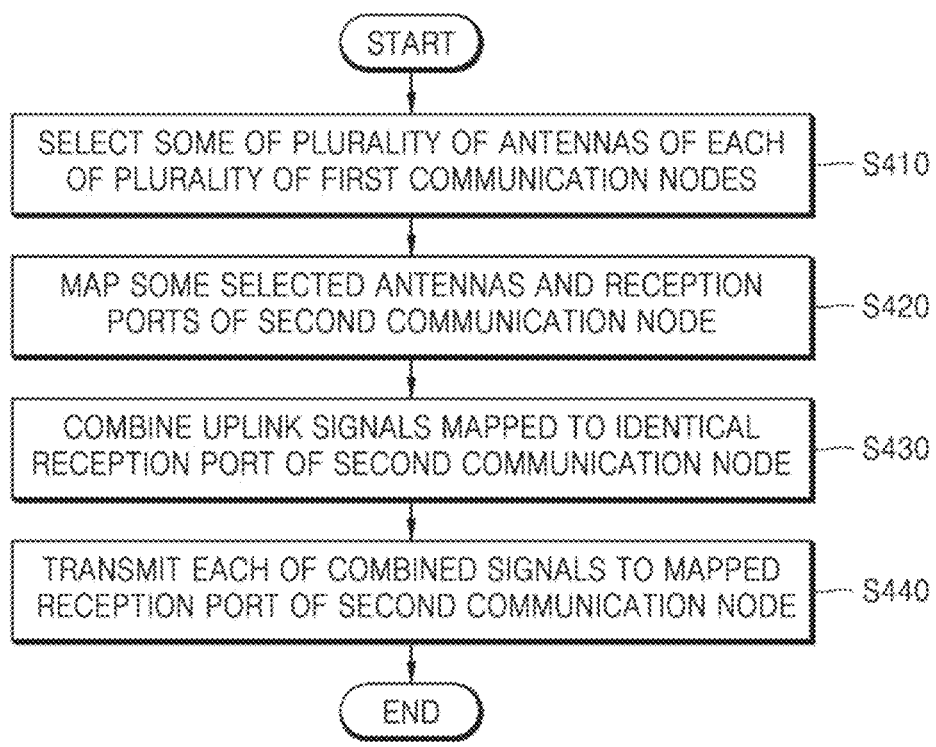
FIG. 4 is a flowchart of a method of operating a communication system according to an embodiment of the present invention.

FIG. 4 is a flowchart of a method of operating a communication system according to an embodiment of the present invention.

Referring to FIGS. 1 to 4, in operation S410, the communication system 10 may select some of a plurality of antennas of each of a plurality of first communication nodes (e.g., the remote units 100-1 to 100-9).

According to an embodiment, the communication system 10 may select some antennas based on the signal quality of uplink signals received through the plurality of antennas of each of the plurality of first communication nodes (e.g., the remote units 100-1 to 100-9), the presence or absence of an uplink signal, or the load of uplink signals.

According to an embodiment, initially, in the communication system 10, some antennas may be arbitrarily selected from among the plurality of antennas of each of the plurality of first communication nodes (e.g., the remote units 100-1 to 100-9), and then some antennas may be reselected flexibly or adaptively based on the signal quality of uplink signals, the presence or absence of an uplink signal, or the load of uplink signals.

In operation S420, the communication system 10 may map some selected antennas and reception ports of the second communication node (e.g., the distributed unit 200).

According to an embodiment, the communication system 10 may map the reception ports of the second communication node (e.g., the distributed unit 200) based on the signal quality of uplink signals received through the plurality of antennas of each of the plurality of first communication nodes (e.g., the remote units 100-1 to 100-9), the presence or absence of an uplink signal, or the load of uplink signals.

In operation S430, the communication system 10 may combine mapped uplink signals to an identical reception port of the second communication node (e.g., the distributed unit 200) through operation S420.

According to an embodiment, the signal combining in operation S430 may be performed at a front end of a reception port of a remote unit, a hub unit, or a distributed unit.

In operation S440, the communication system 10 may transmit each of the combined signals to a reception port of the second communication node (e.g., the distributed unit 200) mapped to each of the combined signals.

Hereinabove, the disclosure has been described with reference to the preferred embodiments. However, it will be appreciated by one of ordinary skill in the art that various modifications and changes of the disclosure can be made without departing from the scope of the inventive concept which are defined in the appended claims and their equivalents.

The invention claimed is:

1. A method of operating a communication system, the method comprising:
   mapping some antennas selected from among a plurality of antennas of each of a plurality of first communication nodes and reception ports of a second communication node;
   combining uplink signals mapped to an identical reception port of the second communication node from among uplink signals received through the plurality of antennas; and
   transmitting the combined signals to the mapped reception ports of the second communication node, respectively.

2. The method of claim 1, wherein each of the first communication nodes is a remote unit or a hub unit, and the second communication node is a distributed unit.

3. The method of claim 1, further comprising:
   selecting some of the antennas to be mapped to the reception ports of the second communication node from among the plurality of antennas of each of the plurality of first communication nodes.

4. The method of claim 3, the selecting comprises:
   selecting the some antennas based on signal quality of the uplink signals received through the plurality of antennas of each of the plurality of first communication nodes.

5. The method of claim 4, wherein the signal quality is a signal to noise ratio (SNR) of a communication signal.

6. The method of claim 3, the selecting comprises:
   selecting the some antennas based on presence or absence of the uplink signal received through the plurality of antennas of each of the plurality of first communication nodes or load of the uplink signals.

7. The method of claim 6, wherein the load of the uplink signals is detected by searching for at least one of a physical random access channel (PRACH) and a physical uplink shared channel (PUSCH) included in the uplink signal.

8. The method of claim 1, wherein the mapping comprises:
   mapping the selected some antennas and the reception ports of the second communication node based on signal quality of the uplink signals received through the plurality of antennas of each of the plurality of first communication nodes.

9. The method of claim 1, wherein the mapping comprises:
   mapping the selected some antennas and the reception ports of the second communication node based on the load of the uplink signals received through the plurality of antennas of each of the plurality of first communication nodes.

10. The method of claim 1, wherein the mapping comprises:
    mapping any one of the plurality of antennas to at least two or more reception ports from among the plurality of reception ports of the second communication node.

11. The method of claim 1, wherein the mapping comprises:
    mapping at least some antennas from among the plurality of antennas of each of the first communication nodes to a reception port of the second communication node having a port number different from a port number of the at least some antennas.

12. The method of claim 1, wherein the mapping is performed in an uppermost node from among the plurality of first communication nodes connected to each other in a cascade structure, the second communication node, or an upper node of the second communication node.

13. The method of claim 1, further comprising:
    combining at least a portion of the uplink signals in an Equal Gain Combine (EGC) or Maximal Ratio Combine (MRC) manner.

14. The method of claim 1, further comprising:
    including mapping information in the uplink signals received by the first communication node.

15. A communication system comprising:
    a plurality of first communication nodes each including a plurality of antennas; and
    a second communication node configured to receive uplink signals transmitted from the plurality of first communication nodes,
    wherein each of the plurality of first communication nodes includes mapping information of some antennas selected from among the plurality of antennas and reception ports of the second communication node to the uplink signals, combines uplink signals mapped to an identical reception port of the second communication node from among uplink signals received through the plurality of antennas based on the mapping information, and transmits the combined signals to the mapped reception ports of the second communication node, respectively.

* * * * *